United States Patent
Mohamed et al.

(10) Patent No.: US 10,513,936 B2
(45) Date of Patent: Dec. 24, 2019

(54) TURBINE HOUSING FOR TURBOCHARGER WITH LINEAR A/R DISTRIBUTION AND NONLINEAR AREA DISTRIBUTION

(71) Applicant: HONEYWELL INTERNATIONAL INC., Morris Plains, NJ (US)

(72) Inventors: Ashraf Mohamed, Torrance, CA (US); Radu C. Florea, Torrance, CA (US); Filip Eckl, Dolni Kounice (CZ)

(73) Assignee: GARRETT TRANSPORTATION I INC., Torrance, CA (US)

( * ) Notice: Subject to any disclaimer, the term of this patent is extended or adjusted under 35 U.S.C. 154(b) by 65 days.

(21) Appl. No.: 15/943,408

(22) Filed: Apr. 2, 2018

(65) Prior Publication Data
US 2019/0301294 A1 Oct. 3, 2019

(51) Int. Cl.
*F01D 25/24* (2006.01)
*F01D 9/02* (2006.01)
*F04D 29/42* (2006.01)

(52) U.S. Cl.
CPC .............. *F01D 9/026* (2013.01); *F01D 25/24* (2013.01); *F04D 29/4213* (2013.01); *F05B 2220/40* (2013.01); *F05B 2240/14* (2013.01); *F05B 2250/5011* (2013.01); *F05B 2250/71* (2013.01)

(58) Field of Classification Search
None
See application file for complete search history.

(56) References Cited

U.S. PATENT DOCUMENTS

| | | | | |
|---|---|---|---|---|
| 4,294,073 A * | 10/1981 | Neff | ........................ | F01N 13/10 415/205 |
| 4,512,714 A * | 4/1985 | Kaesser | ................ | F01D 17/146 415/151 |
| 2003/0000497 A1* | 1/2003 | Brosseau | ................ | F02B 31/06 123/399 |
| 2007/0209361 A1* | 9/2007 | Pedersen | ................ | F01D 9/026 60/602 |
| 2011/0197863 A1* | 8/2011 | Lim | ........................ | F02M 26/73 123/568.26 |
| 2011/0314808 A1* | 12/2011 | Mohamed | ................ | F01D 5/141 60/602 |

(Continued)

FOREIGN PATENT DOCUMENTS

EP 1304445 A2 4/2003
WO 2008009936 A1 1/2008

(Continued)

*Primary Examiner* — Michael Lebentritt
(74) *Attorney, Agent, or Firm* — Lorenz & Kopf, LLP (57) ABSTRACT

A turbine housing includes a volute flow passage with an inlet and an end that are spaced apart along a flow axis in a circumferential direction about an axis of rotation. The volute flow passage defines a plurality of cross sections arranged in series along the flow axis from the inlet to the end. The plurality of cross sections are taken normal to the flow axis. The plurality of cross sections have an area (A) and a centroid, and the centroid is spaced at a radial distance (R) from the axis of rotation. The volute flow passage has a sidewall angle distribution from the inlet to the end that is at least partly nonlinear. The volute flow passage has an A/R-distribution from the inlet to the end that is substantially linear. The volute flow passage has an A-distribution from the inlet to the end that is at least partly nonlinear.

20 Claims, 8 Drawing Sheets

(56) References Cited

U.S. PATENT DOCUMENTS

| | | | | |
|---|---|---|---|---|
| 2013/0152582 A1* | 6/2013 | Anschel | ................. | F01D 9/026 60/605.2 |
| 2014/0241866 A1* | 8/2014 | Smith | ................. | F04D 29/284 415/185 |
| 2015/0275913 A1* | 10/2015 | Mohamed | ................. | F01D 1/14 416/179 |
| 2018/0094530 A1* | 4/2018 | Smith | ....................... | F01D 5/04 |
| 2018/0328281 A1* | 11/2018 | Eckl | ........................ | F02C 6/12 |

FOREIGN PATENT DOCUMENTS

| | | | |
|---|---|---|---|
| WO | 2015092373 | A1 | 6/2015 |
| WO | 2015099199 | A1 | 7/2015 |
| WO | 2017176186 | A1 | 10/2017 |

\* cited by examiner

TURBINE HOUSING FOR TURBOCHARGER WITH LINEAR A/R DISTRIBUTION AND NONLINEAR AREA DISTRIBUTION

TECHNICAL FIELD

The present disclosure generally relates to a turbine housing for a turbocharger and, more particularly, relates to a turbine housing for a turbocharger with a linear Area/Radius (A/R) distribution and nonlinear area and radius distributions.

BACKGROUND

Some vehicles include a turbocharger for boosting the performance of an internal combustion engine. More specifically, these devices can increase the engine's efficiency and power output by forcing extra air into the combustion chamber of the engine.

The turbine section of the turbocharger typically includes a turbine wheel and a turbine housing. Exhaust gas flows into the housing and is directed toward the turbine wheel to drive the wheel in rotation and to drive a compressor wheel, which is mounted on the same shaft as the turbine wheel.

The shape, dimensions, etc. of the turbine housing may affect performance of the turbocharger. More specifically, the shape of the turbine housing may directly affect how the exhaust gas flows, thereby, affecting how the gas impinges on the turbine wheel. The turbine housing may direct exhaust gas toward the turbine wheel with high effectiveness at some engine speeds, but performance may be degraded at other engine speeds. Likewise, there may be a pulse flow of exhaust gas that degrades performance of the turbocharger.

Thus, it is desirable to provide a turbocharger system with a turbine housing that improves turbocharger performance. Other desirable features and characteristics of the present disclosure will become apparent from the subsequent detailed description and the appended claims, taken in conjunction with the accompanying drawings and this background discussion.

BRIEF SUMMARY

In one embodiment, a turbocharger system is disclosed that includes a turbine wheel configured to rotate about an axis of rotation. The turbocharger system also include a turbine housing that houses the turbine wheel. The turbine housing defines at least one scroll with a volute flow passage. The volute flow passage has an inlet and an end that are spaced apart along a flow axis in a circumferential direction about the axis of rotation. The volute flow passage defines a plurality of cross sections arranged in series along the flow axis from the inlet to the end. The plurality of cross sections are taken normal to the flow axis. The plurality of cross sections have an area (A) and a centroid, and the centroid is spaced at a radial distance (R) from the axis of rotation. The volute flow passage has a sidewall angle distribution from the inlet to the end that is at least partly nonlinear. The volute flow passage has an A/R-distribution from the inlet to the end that is substantially linear. The volute flow passage has an A-distribution from the inlet to the end that is at least partly nonlinear.

In addition, a method of manufacturing a turbine housing of a turbocharger system is disclosed. The turbine housing is configured to house a turbine wheel that rotates about an axis of rotation. The method includes forming the turbine housing to include at least one scroll that extends in a circumferential direction about an axis of rotation. The method also includes forming the at least one scroll with a volute flow passage therein. The volute flow passage has an inlet and an end that are spaced apart along a flow axis in the circumferential direction. The volute flow passage defines a plurality of cross sections arranged in series along the flow axis from the inlet to the end. The plurality of cross sections are taken normal to the flow axis. The plurality of cross sections have an area (A) and a centroid. The centroid is spaced at a radial distance (R) from the axis of rotation. The volute flow passage has a sidewall angle distribution from the inlet to the end that is at least partly nonlinear. The volute flow passage has an A/R-distribution from the inlet to the end that is substantially linear. The volute flow passage has an A-distribution from the inlet to the end that is at least partly nonlinear.

In an additional embodiment, a turbocharger is disclosed. The turbocharger includes a turbine wheel configured to rotate about an axis of rotation. The turbocharger further includes a turbine housing that houses the turbine wheel. The turbine housing defines at least one scroll with a volute flow passage. The volute flow passage has an inlet and an end that are spaced apart along a flow axis in a circumferential direction about the axis of rotation. The volute flow passage defines a plurality of cross sections arranged in series along the flow axis from the inlet to the end. The plurality of cross sections are taken normal to the flow axis. The plurality of cross sections have an area (A) and a centroid. The centroid is spaced at a radial distance (R) from the axis of rotation. The volute flow passage has a sidewall angle distribution from the inlet to the end that is at least partly nonlinear. The volute flow passage has an A/R-distribution from the inlet to the end that is substantially linear. The volute flow passage has a negative exponential A-distribution proximate the inlet. The volute flow passage has an R-distribution from the inlet to the end and has two inflection points.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a turbocharger with a turbine housing having at least one scroll structure (i.e., scroll, volute structure, etc.). In some embodiments, the turbine housing may have a plurality of scroll structures. In one embodiment, the turbine housing may have two scroll structures that are mirror images of each other (i.e., twin scrolls). In another embodiment, the scroll structures may be asymmetrical.

In some embodiments of the present disclosure, at least one scroll structure may have an internal volute flow passage that extends along a flow axis in a scroll-like fashion about an axis of rotation of a turbine wheel. The flow passage may define an inlet and an end, which are spaced apart in a circumferential direction along the flow axis.

The cross section of the flow passage (taken perpendicular to the flow axis) may change as the flow passage progressively extends along the flow axis. The area (A) of the cross section of the flow passage may gradually reduce as the flow passage progressively extends along the flow axis. Another variable that changes along the flow axis is the radial distance (R) from the axis of rotation of the turbine wheel to the centroid of the cross section.

The turbine housing and/or the flow passage defined therein may be configured according to a linear Area/Radius (A/R) distribution from the inlet to the end. This feature may provide certain aerodynamic benefits. For example, the configuration of the flow passage may provide substantially uniform flow toward the turbine wheel within the turbine housing, from the inlet to the end of the flow passage. The linear A/R-distribution may ensure that fluid flowing into the turbine housing impinges on the turbine wheel uniformly over the entire circumference of the turbine wheel. The flow angle or inlet angle of the air on the turbine wheel may be highly controlled for increased operating efficiency of the turbocharger.

In addition, the shape (profile, etc.) of the cross section may vary along the flow axis from the inlet to the end of the volute structure. In other words, the shape, profile, etc. may "evolve" along the flow axis.

The flow passage may be configured according to a non-linear Area (A) distribution from the inlet to the end. In addition, in some embodiments, the flow passage may have a sidewall angle distribution that is at least partly nonlinear from the inlet to the end.

Accordingly, in some embodiments, the flow passage may be shaped with a relatively large volume proximate the inlet. However, the cross sectional area may change (reduce) substantially moving away from the inlet in the circumferential direction. The rate of change in this cross sectional area may be high proximate the inlet as compared with portions of the flow passage that are further downstream along the flow axis. These features may ameliorate the otherwise negative effects of pulse flow of the exhaust gas into the turbine housing.

Figure 1:
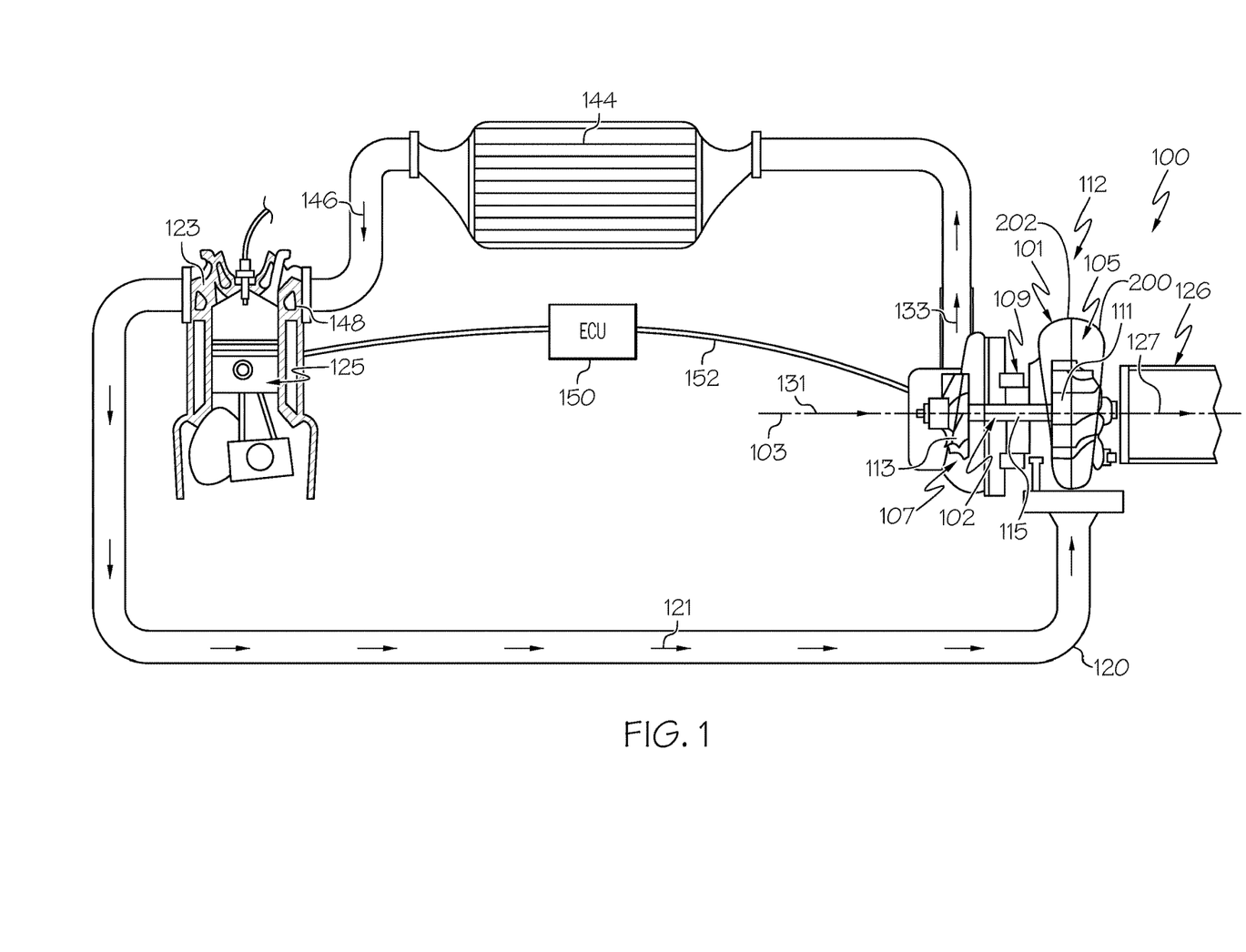
FIG. 1 is a schematic view of a vehicle engine system, which includes a turbocharger according to example embodiments of the present disclosure.

FIG. 1 is a schematic view of an example turbocharger system 100 that includes a turbocharger 112. The turbocharger 112 generally includes a turbocharger housing 101 and a rotor 102. The rotor 102 is configured to rotate within the turbocharger housing 101 about an axis of rotor rotation 103. The rotor 102 may be supported for rotation about the axis 103 via one or more bearings (not shown). In some embodiments, the rotor 102 may be rotationally supported by thrust bearings and a plurality of journal bearings. Alternatively, other bearings may be included.

As shown in the illustrated embodiment, the turbocharger housing 101 may include a turbine housing 105, a compressor housing 107, and a bearing housing 109. The bearing housing 109 may be disposed between the turbine and compressor housings 105, 107. Also, in some embodiments, the bearing housing 109 may contain the bearings of the rotor 102.

Additionally, the rotor 102 includes a turbine wheel 111, a compressor wheel 113, and a shaft 115. The turbine wheel 111 is located substantially within the turbine housing 105. The compressor wheel 113 is located substantially within the compressor housing 107. The shaft 115 extends along the axis of rotation 103, through the bearing housing 109, to connect the turbine wheel 111 to the compressor wheel 113. Accordingly, the turbine wheel 111 and the compressor wheel 113 rotate together about the axis 103.

The turbine housing 105 and the turbine wheel 111 cooperate to form a turbine (i.e., turbine section, turbine stage) configured to circumferentially receive a high-pressure and high-temperature exhaust gas stream 121 from an engine, e.g., from an exhaust manifold 123 of an internal combustion engine 125. An exhaust pipe 120 may extend between and may fluidly connect the exhaust manifold 123 and the turbine housing 105, and the exhaust pipe 120 may deliver the exhaust gas stream 121 to the turbine housing 105. The turbine wheel 111 (and thus the rotor 102) is driven in rotation around the axis 103 by the high-pressure and high-temperature exhaust gas stream 121, which becomes a lower-pressure and lower-temperature exhaust gas stream 127 that is released into a downstream exhaust pipe 126.

The compressor housing 107 and compressor wheel 113 form a compressor (i.e., compressor section, compressor stage). The compressor wheel 113, being driven in rotation by the exhaust-gas driven turbine wheel 111, is configured to compress received input air 131 (e.g., ambient air, or already-pressurized air from a previous-stage in a multi-stage compressor) into a pressurized air stream 133. The pressurized air stream 133 is ejected circumferentially from the compressor housing 107. The compressor housing 107 may have a shape (e.g., a volute shape or otherwise) configured to direct and pressurize the air blown from the compressor wheel 113. Due to the compression process, the pressurized air stream 133 is characterized by an increased temperature, over that of the input air 131.

The pressurized airstream 133 may be channeled through an air cooler 144 (i.e., intercooler), such as a convectively cooled charge air cooler. The air cooler 144 may be configured to dissipate heat from the pressurized air stream 133, increasing its density. The resulting cooled and pressurized output air stream 146 is channeled into an intake manifold 148 of the internal combustion engine 125, or alternatively, into a subsequent-stage, in-series compressor. The operation of the system 100 may be controlled by an ECU 150 (engine control unit) that connects to the remainder of the system via communication connections 152.

Figure 2:
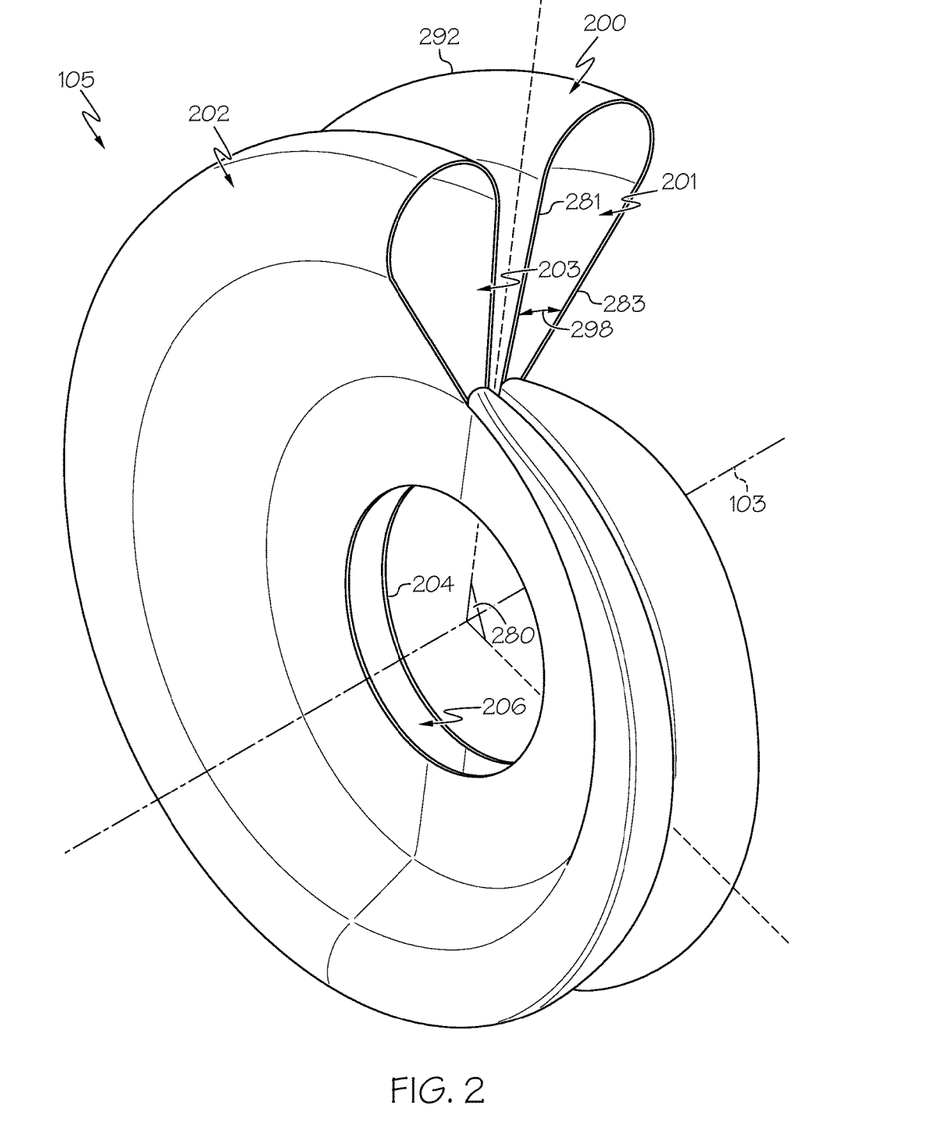
FIG. 2 is a perspective view of a turbine housing of the turbocharger of FIG. 1 according to example embodiments of the present disclosure.
Figure 3:
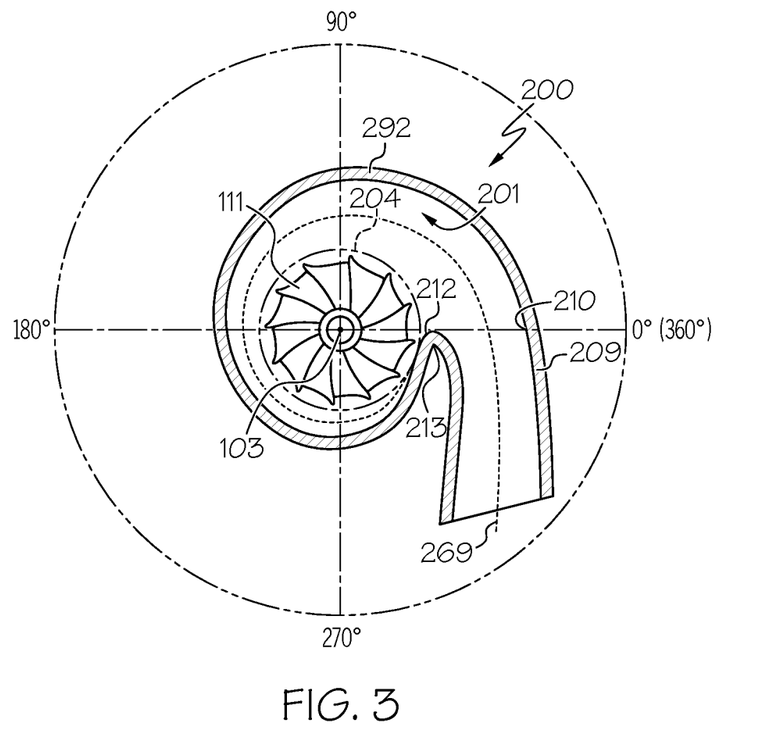
FIG. 3 is a section view of the turbine housing and a turbine wheel of the turbocharger of FIG. 1 according to example embodiments of the present disclosure.

Referring now to FIGS. 2 and 3, the turbine housing 105 is illustrated in detail according to example embodiments of the present disclosure. As shown in FIG. 2, the turbine housing 105 may generally include a first scroll 200 and a second scroll 202. The first scroll 200 may be hollow and shell-like, and may define a first volute flow passage 201 that extends circumferentially about the axis 103. The second scroll 202 may define a second volute flow passage 203 that extends circumferentially about the axis 103.

The first scroll 200 and the second scroll 202 may be fixed together and arranged back-to-back. In some embodiments, the first scroll 200 and the second scroll 202 may be substantially symmetrical with an imaginary plane 280 representing a plane of symmetry between the two scrolls 200, 202. Accordingly, the turbine housing 105 may have a twin-scroll arrangement. In other embodiments, the turbine housing 105 may include asymmetrical scrolls.

The first scroll 200 and the second scroll 202 may also cooperate to define an inner rim 204 of the turbine housing 105 that encircles the axis 103. The inner rim 204 may be substantially circular. The turbine wheel 111 may be disposed within and surrounded by the inner rim 204 (FIG. 3). The inner rim 204 may include an inner diameter opening 206 (FIG. 2). The inner diameter opening 206 may face inwardly in the radial direction toward the axis 103 and, thus, toward the turbine wheel 111.

As shown in FIG. 3, the turbine housing 105 may also include an inlet segment 209 that extends in a tangential direction from the first scroll 200 and the second scroll 202. The inlet segment 209 may be fluidly connected to the exhaust pipe 120 so as to receive the exhaust gas stream 121 from the engine 125 (FIG. 1). Accordingly, the exhaust gas stream 121 may be directed toward the first volute flow passage 201 and/or the second volute flow passage 203. The downstream exhaust pipe 126 (FIG. 1) may also be connected to the turbine housing 105 and may extend along the axis 103 therefrom.

Accordingly, the exhaust gas stream 121 from the engine 125 may flow along the exhaust pipe 120 and may flow into the inlet segment 209 of the turbine housing 105. This flow may be directed into the first and/or second volute flow passages 201, 203. The exhaust may flow in the circumferential direction about the axis 103 and radially inward toward the axis 103 and may flow through the inner diameter opening 206 to impinge upon and drive the turbine wheel 111 in rotation. The gas may flow further downstream along the axis 103 into the exhaust pipe 126.

The cross section of FIG. 3 illustrates additional features of the first scroll 200 and the first volute flow passage 201 therein. A flow axis 269 of the flow passage 201 is indicated as well. It will be appreciated that the first scroll 200 and the first volute flow passage 201 may be representative of the second scroll 202 and the second volute flow passage 203, respectively.

As shown, the first scroll 200 may include an outer peripheral wall 292. The outer peripheral wall 292 may extend circumferentially from the inlet segment 209, and the outer peripheral wall 292 may intersect the opposite side of the inlet segment 209 at a tongue area 213.

As shown in FIG. 2, the first scroll 200 may also define a first sidewall 281 and a second sidewall 283, which both extend between the inner rim 204 to the outer peripheral wall 292. The first sidewall 281 may be disposed along the axis 103 between the plane 280 and the second sidewall 283. Outer portions of the first and second sidewalls 281, 283 may be disposed at an angle 298 relative to each other (i.e., a sidewall angle).

As shown in FIG. 3, the first volute flow passage 201 may include an inlet 210 and an end 212. The inlet 210 and the end 212 may be spaced apart along the flow axis 269. The inlet 210 may be disposed at a zero-degree (0°) circumferential position in some embodiments. The inlet segment 209 may be fluidly connected to the first volute flow passage 201 at the inlet 210. The end 212 may be disposed at a three-hundred-sixty degree (360°) circumferential position with respect to the axis 103. It will be appreciated that the value of the circumferential position increases from the inlet 210 to the end 212 (i.e., in a downstream direction) along the flow axis 269.

Figure 4:
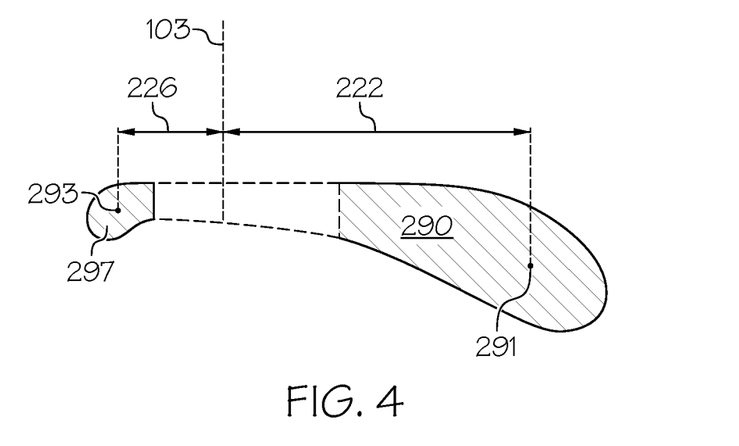
FIG. 4 is a section view of the turbine housing of FIG. 2 showing cross sections of a volute flow passage of the housing at two different circumferential positions.
Figure 5:
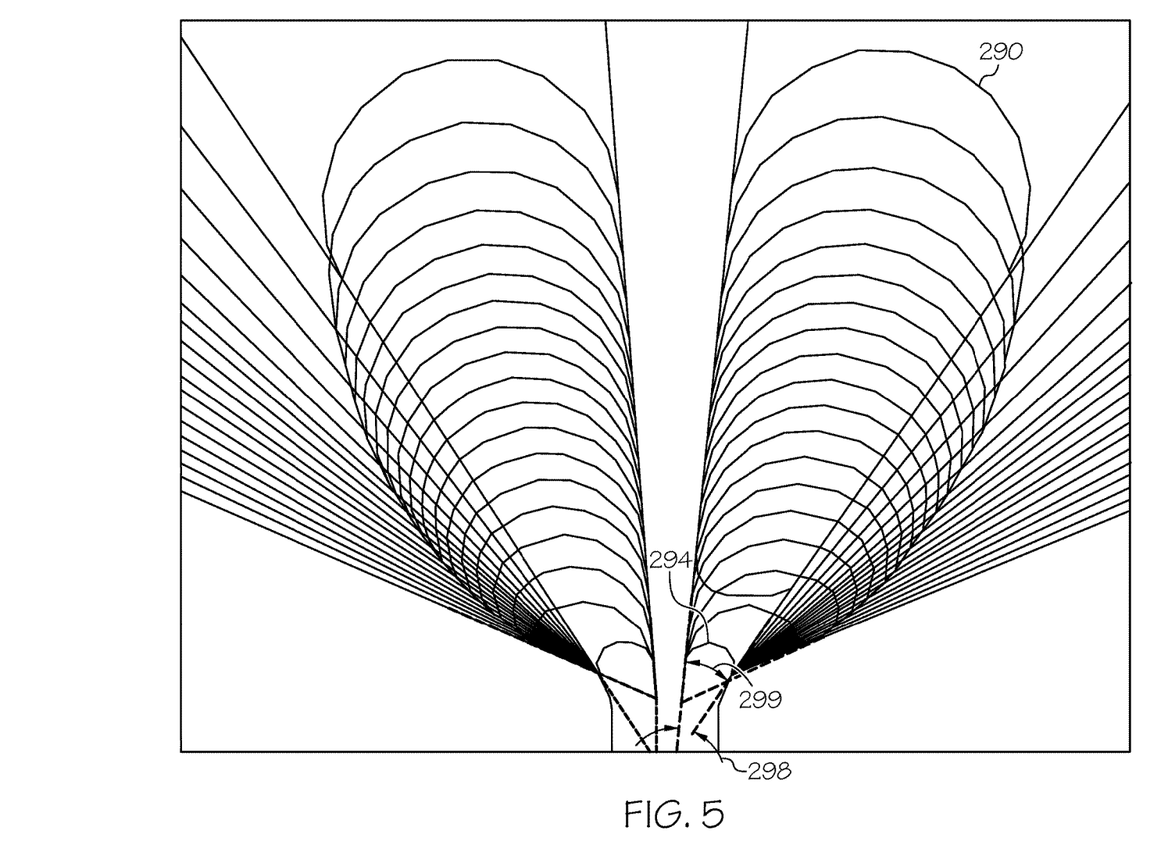
FIG. 5 is a section view of the turbine housing of FIG. 2, wherein different cross sections of the volute flow passage are projected onto a common plane.

The flow passage 201 may have a cross section taken perpendicular to the flow axis 269 as represented in FIGS. 4 and 5. The cross section may be defined by the inside surfaces of the first sidewall 281, the second sidewall 283, the outer peripheral wall 292, and the inner rim 204. The cross section may have any suitable shape. For example, as shown, the cross section may be elongated in the radial direction and may bulge at the outer radial portions. The cross section may be more slender closer toward the axis 103.

The shape of the cross section of the flow passage 201 may change as it extends along the flow axis 269. Also, the area (A) of the cross section of the flow passage 201 may change as it extends along the flow axis 269. The cross section may be relatively large at the inlet 210, may gradually reduce along the flow axis 269, and may be relative small at the end 212. Accordingly, it may be said that the flow passage 201 may define a plurality of cross sections arranged in series along the flow axis 269 from the inlet 210 to the end 212. FIG. 4 illustrates two such cross sections, namely, a first cross section 290 and a second cross section 297. In some embodiments, the first cross section 290 may represent the flow passage 201 at the inlet 210 (e.g., at the zero-degree (0°) position). Also, the second cross section 297 may represent the flow passage 201 at the one-hundred-eighty-degree (180°) position. FIG. 5 superimposes multiple cross sections of the flow passage 201 onto a common plane.

As shown in FIG. 4, the radial distance (R) from the axis of rotation 103 to the center of the cross section may reduce gradually as the flow passage 201 advances downstream along the flow axis 169. For example, the first cross section 290 may define a first centroid 291, and the second cross section 297 may define a second centroid 293. The first centroid 291 may be spaced a first radial distance 222 from the axis of rotation 103. The second centroid 293 may be spaced a second radial distance 226 from the axis of rotation 103.

Moreover, as shown in FIG. 5, the sidewall angle may change as the flow passage 201 advances downstream along the flow axis 169. For example, the sidewall angle 298 at the first cross section 290 (at the inlet 210) may be smaller than the sidewall angle 299 at a third cross section 294 (at the end 212). In some embodiments, the sidewall angle may gradually increase along the flow axis 169 from the inlet 210 to the end 212.

The turbine housing 105 may be manufactured in a variety of ways without departing from the scope of the present disclosure. In some embodiments, the turbine housing 105 may constructed as a unitary part, and in other embodiments, the turbine housing 105 may be assembled from multiple parts. The turbine housing 105 may be formed via casting operations, using additive manufacturing techniques, or in other ways. The flow passages 201, 203 may be constructed to have predetermined shapes and dimensions that provide certain advantages as will be discussed in detail below.

Figure 6:
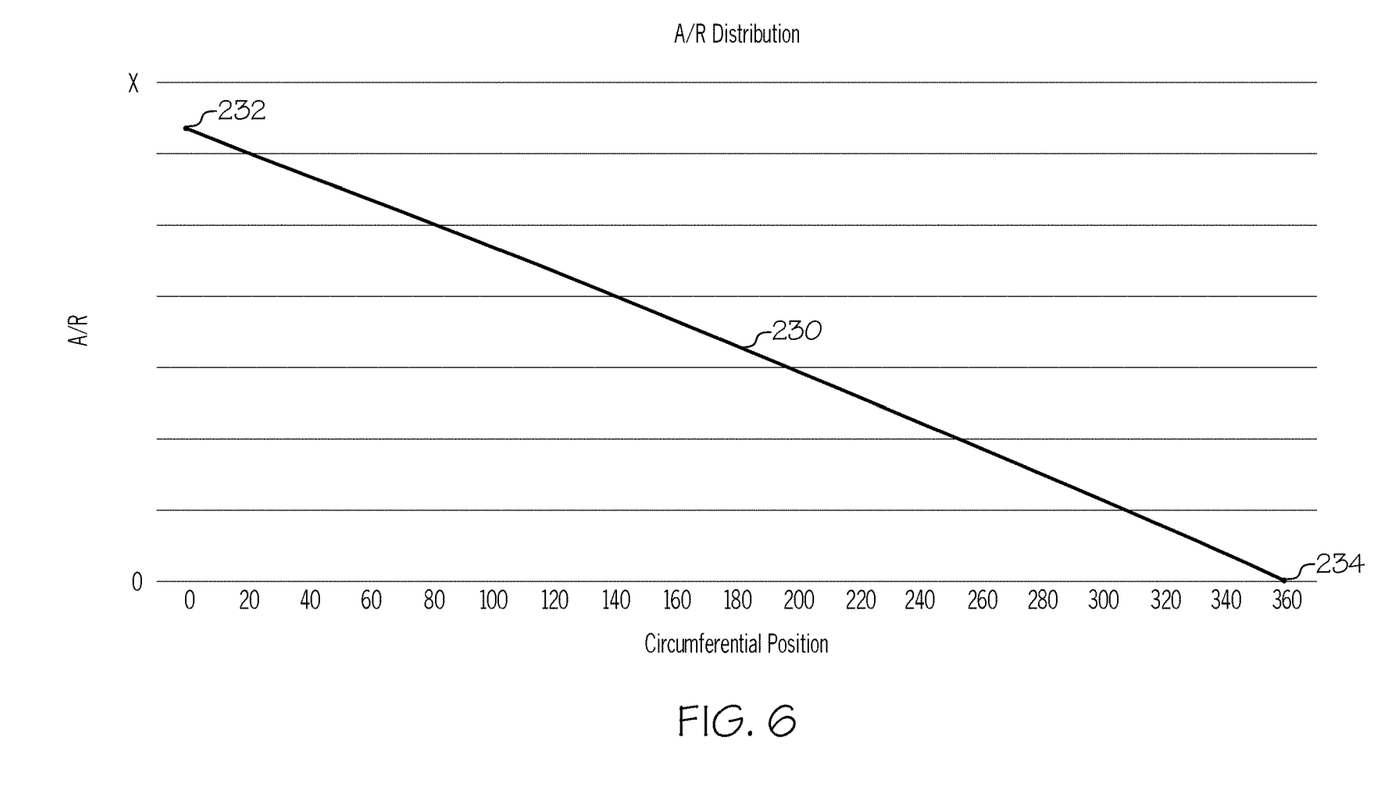
FIG. 6 is a graph illustrating an Area/Radius (A/R) distribution of the volute flow passage according to example embodiments.

FIG. 6 represents an example A/R-distribution of the flow passage 201.

Specifically, the X-axis represents circumferential position, and the Y-axis represents the ratio of cross sectional area (A) to radial distance (R) of the centroid to the axis 103. The graph has been normalized such that the Y-axis ranges from zero (0) to a value of X. The line 230 represents the A/R relationship of the flow passage 201, with point 232 representing the ratio at the inlet 210, and point 234 representing the ratio at the end 212. As shown, the A/R-distribution of the flow passage 201 may be substantially linear from the inlet 210 to the end 212.

The substantially linear A/R-distribution may provide certain aerodynamic benefits. For example, this configuration of the flow passage 201 may provide substantially uniform flow toward the turbine wheel 111, from the inlet 210 to the end 212. The linear A/R-distribution may ensure that fluid flowing into the turbine housing impinges on the turbine wheel 111 uniformly over its entire circumference.

Figure 7:
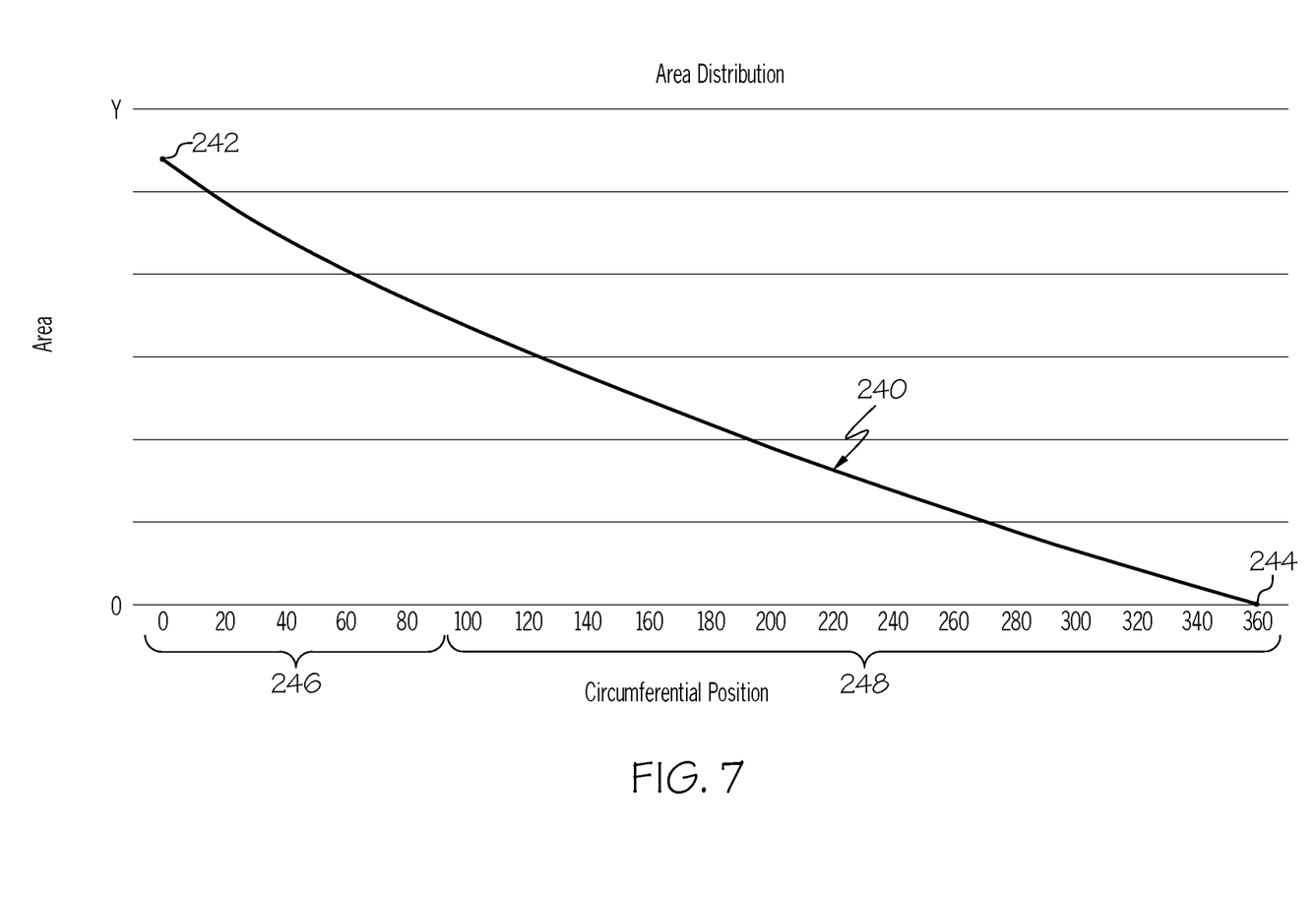
FIG. 7 is a graph illustrating an Area (A) distribution of the volute flow passage according to example embodiments.

Also, as shown in FIG. 7, the A-distribution of the flow passage 201 from the inlet 210 to the end 212 may be nonlinear. Specifically, in FIG. 7, the X-axis represents circumferential position, and the Y-axis represents the area of the cross section in those circumferential positions. The graph has been normalized such that the Y-axis ranges from zero (0) to the value of Y. The line 240 represents the A-distribution of the flow passage 201, with point 242 representing the area of the cross section at the inlet 210, and the point 244 representing the area of the cross section at the end 212. As shown, the A-distribution of the flow passage 201 may be configured with a first region 246 that has a negative exponential distribution and a second region 248 that is substantially linear. In some embodiments, the first region 246 may be proximate the inlet 210 (e.g., from the zero-degree circumferential position to the ninety-degree circumferential position) and may be spaced apart from the end 212 along the flow axis 269. The second region 248 may extend from the first region 246 to the end 212. As such, the line 240 representing the A-distribution may be concave in the first region 246. Therefore, the cross sectional area of the inlet 210 and the volume of the flow passage 201 proximate the inlet 210 may be relatively large. The rate of change (reduction) of the cross sectional area of the flow passage 201 from the inlet 210 in the downstream direction may be relatively high. This rate of change in cross sectional area may be higher proximate the inlet 210 (i.e., in the first region 246) as compared with the rate of change proximate the end 212 (i.e., in the second region 248).

Figure 8:
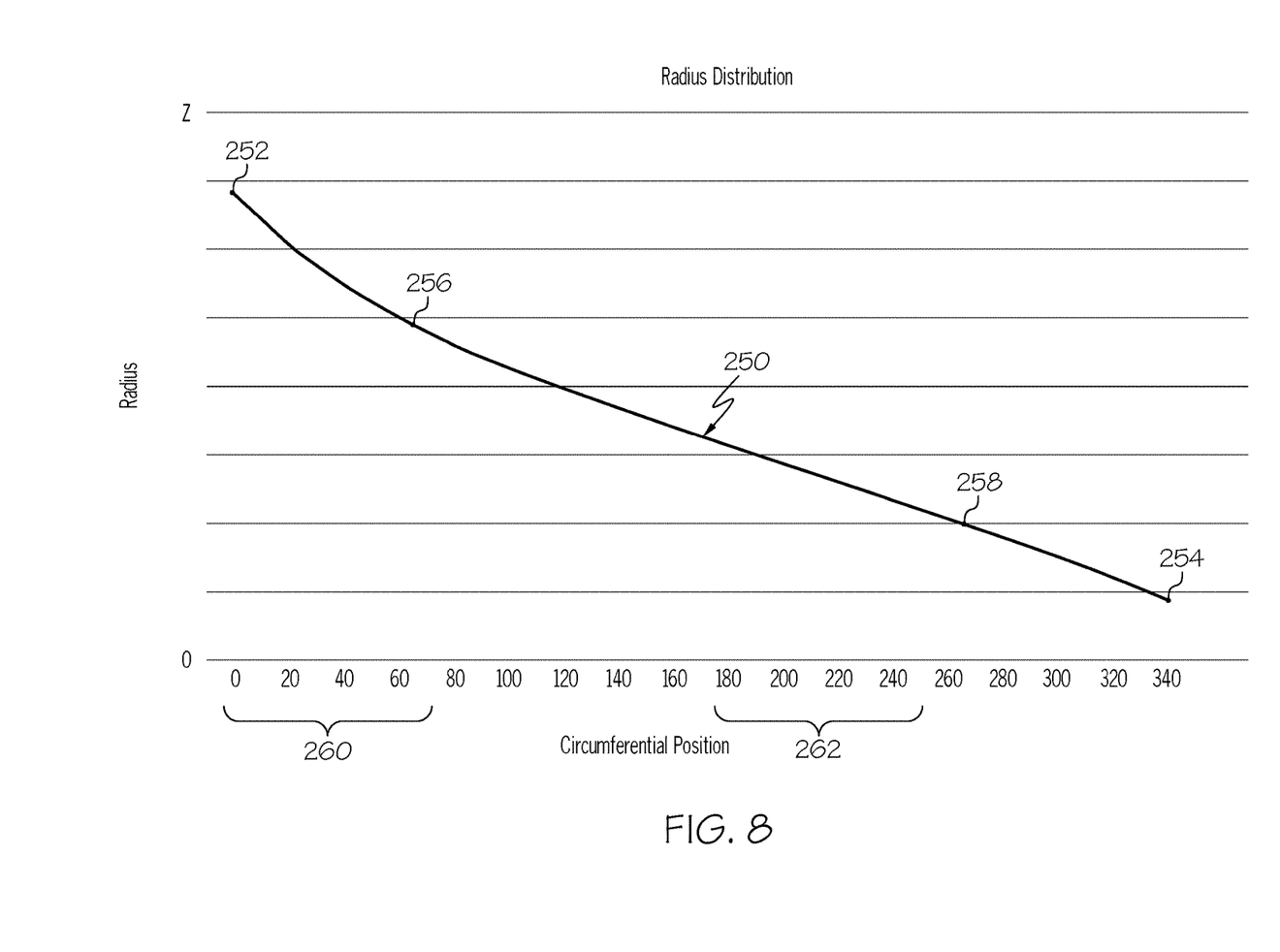
FIG. 8 is a graph illustrating a Radius (R) distribution of the volute flow passage according to example embodiments of the present disclosure.

Moreover, as shown in FIG. 8, the R-distribution of the flow passage 201 from the inlet 210 to the end 212 may be nonlinear. Specifically, in FIG. 8, the X-axis represents circumferential position, and the Y-axis represents the radial distance of the centroid of the cross section to the axis 103. The graph has been normalized such that the Y-axis ranges from zero (0) to the value of Z. The line 250 represents the R-distribution of the flow passage 201, with point 252 representing the radial distance at the inlet 210, and the point 254 representing the radial distance of the cross section proximate the end 212. As shown, the R-distribution of the flow passage 201 may have a plurality (e.g., two) inflection points, where the curve changes direction. In some embodiments, the R-distribution may include a first inflection point 256 and a second inflection point 258. The R-distribution may have a first region 260 with a negative exponential distribution proximate the inlet 210 (e.g., from the zero degree (0°) circumferential position to the seventy-degree (70°) circumferential position). The R-distribution may also have a second region 262 further downstream with a positive exponential distribution. The second region 262 may be defined proximate the end 212 (e.g., from the one-hundred-eighty-degree (180°) circumferential position to the two-hundred-seventy-degree (270°) position) of the flow passage 201.

Figure 9:
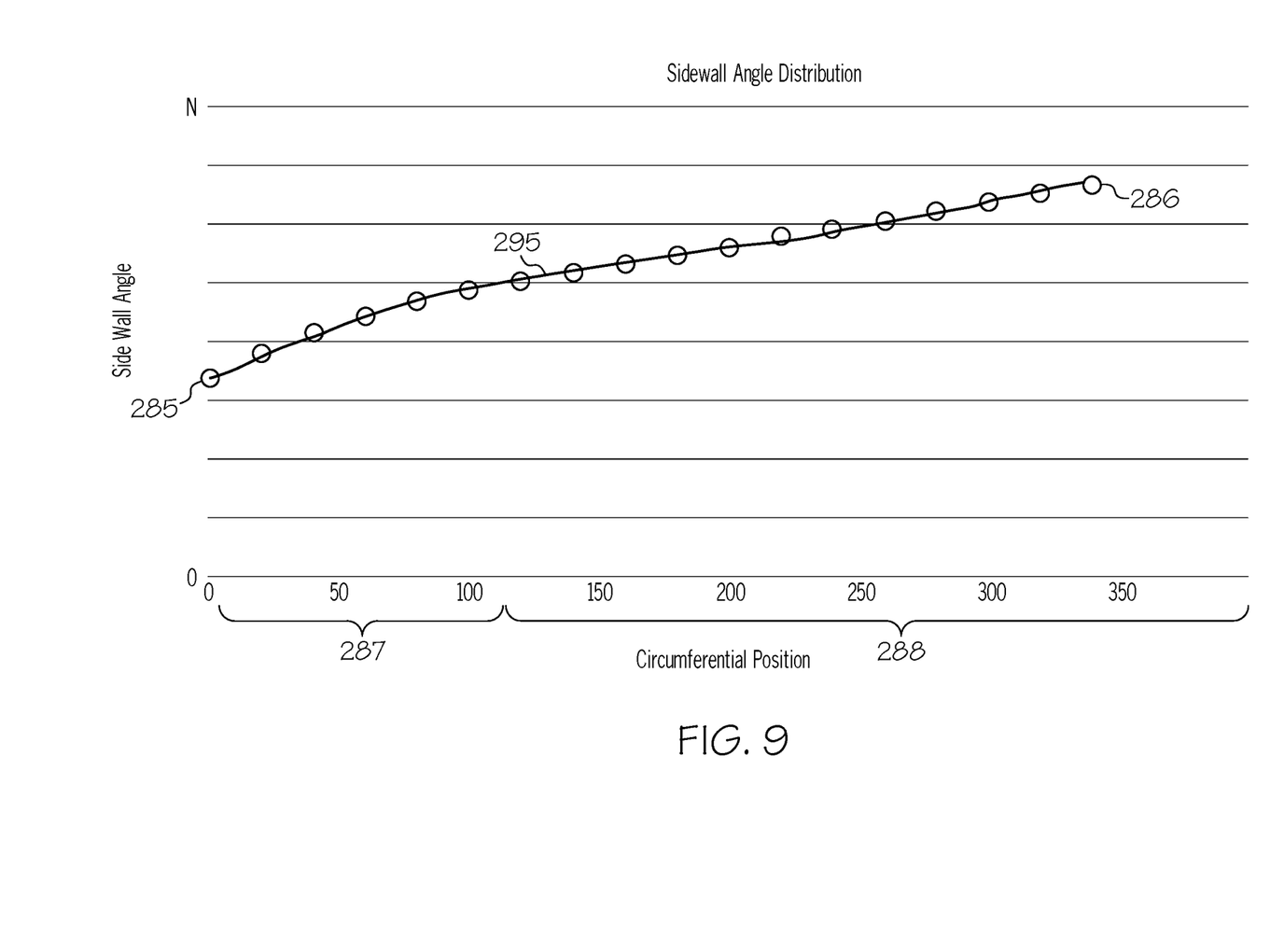
FIG. 9 is a graph illustrating a sidewall angle distribution of the volute flow passage according to example embodiments.

Additionally, as shown in FIG. 9, the sidewall angle distribution of the flow passage 201 from the inlet 210 to the end 212 may be at least partly nonlinear. Specifically, in FIG. 9, the X-axis represents circumferential position, and the Y-axis represents the sidewall angle measured between the sidewalls 281, 283. The graph has been normalized such that the Y-axis ranges from zero (0) to the value of N. The line 295 represents the sidewall angle distribution of the flow passage 201 with point 285 representing the sidewall angle at the inlet 210, and the point 286 representing the sidewall angle proximate the end 212. The sidewall angle distribution may have a first region 287 with a positive exponential distribution proximate the inlet 210 (e.g., from the zero degree (0°) circumferential position to the one-hundred-degree (100°) circumferential position). The sidewall angle distribution may also have a second region 288 that increases substantially linearly (e.g., from the one-hundred-degree (100°) circumferential position to the three-hundred-sixty-degree (360°) position) of the flow passage 201.

The A-distribution, the R-distribution, and/or the sidewall angle distribution of the flow passage 201, as described above, may improve performance of the turbocharger 112. For example, these features may ameliorate otherwise negative effects of pulse flow of exhaust gas on operation of the turbocharger 112.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A turbocharger system comprising:
   a turbine wheel configured to rotate about an axis of rotation; and
   a turbine housing that houses the turbine wheel, the turbine housing defining at least one scroll with a volute flow passage, the volute flow passage having an inlet and an end that are spaced apart along a flow axis in a circumferential direction about the axis of rotation;
   the volute flow passage defining a plurality of cross sections arranged in series along the flow axis from the inlet to the end, the plurality of cross sections taken normal to the flow axis, the plurality of cross sections having an area (A), a centroid spaced at a radial distance (R) from the axis of rotation, and a sidewall angle;
   the volute flow passage having a sidewall angle distribution from the inlet to the end that is at least partly nonlinear;
   the volute flow passage having an A/R-distribution from the inlet to the end that is substantially linear; and the volute flow passage having an A-distribution from the inlet to the end that is at least partly nonlinear.

2. The turbocharger system of claim 1, wherein the inlet is disposed substantially at a zero degree (0°) circumferential position with respect to the axis of rotation; and
wherein the end is disposed substantially at a three hundred sixty degree (360°) circumferential position with respect to the axis of rotation.

3. The turbocharger system of claim 1, wherein the at least one scroll is a first scroll with a first volute flow passage;
wherein the turbine housing includes a second scroll with a second volute flow passage;
wherein the second volute flow passage has an A/R-distribution that is substantially linear; and
wherein the second volute flow passage has an A-distribution is at least partly nonlinear.

4. The turbocharger system of claim 3, wherein the first volute flow passage and the second volute flow passage are substantially symmetrical.

5. The turbocharger system of claim 1, wherein the A-distribution along a portion of the flow passage has substantially a negative exponential distribution.

6. The turbocharger system of claim 5, wherein the portion is proximate the inlet and is spaced apart along the flow axis from the end.

7. The turbocharger system of claim 1, wherein the volute flow passage has an R-distribution from the inlet to the end that is at least partly nonlinear; and
wherein the R-distribution includes a plurality of inflection points.

8. The turbocharger system of claim 7, wherein the R-distribution along a first portion of the flow passage has substantially a negative exponential distribution; and
wherein the R-distribution along a second portion of the flow passage has substantially a positive exponential distribution.

9. The turbocharger system of claim 8, wherein the first portion is proximate the inlet and wherein the second portion is proximate the end.

10. A method of manufacturing a turbine housing of a turbocharger system, the turbine housing configured to house a turbine wheel that rotates about an axis of rotation, the method comprising:
forming the turbine housing to include at least one scroll that extends in a circumferential direction about an axis of rotation;
forming the at least one scroll with a volute flow passage therein, the volute flow passage having an inlet and an end that are spaced apart along a flow axis in the circumferential direction;
the volute flow passage defining a plurality of cross sections arranged in series along the flow axis from the inlet to the end, the plurality of cross sections taken normal to the flow axis, the plurality of cross sections having an area (A), a centroid spaced at a radial distance (R) from the axis of rotation, and a sidewall angle;
the volute flow passage having a sidewall angle distribution from the inlet to the end that is at least partly nonlinear;
the volute flow passage having an A/R-distribution from the inlet to the end that is substantially linear; and
the volute flow passage having an A-distribution from the inlet to the end that is at least partly nonlinear.

11. The method of claim 10, wherein forming the at least one scroll includes:
forming the inlet disposed substantially at a zero degree (0°) circumferential position with respect to the axis of rotation; and
forming the end disposed substantially at a three hundred sixty degree (360°) circumferential position with respect to the axis of rotation.

12. The method of claim 10, wherein forming the at least one scroll includes forming a first scroll with a first volute flow passage;
wherein forming the at least one scroll includes forming a second scroll with a second volute flow passage;
wherein the second volute flow passage has an A/R-distribution that is substantially linear; and
wherein the second volute flow passage has an A-distribution is at least partly nonlinear.

13. The method of claim 12, wherein forming the at least one scroll includes forming the first volute flow passage and the second volute flow passage as being substantially symmetrical.

14. The method of claim 10, wherein the A-distribution along a portion of the flow passage has substantially a negative exponential distribution.

15. The method of claim 14, wherein the portion is proximate the inlet and is spaced apart along the flow axis from the end.

16. The method of claim 10, wherein forming the at least one scroll includes forming the volute flow passage to have an R-distribution from the inlet to the end that is at least partly nonlinear, and wherein the R-distribution includes a plurality of inflection points.

17. The method of claim 16, wherein the R-distribution along a first portion of the flow passage has substantially a negative exponential distribution; and
wherein the R-distribution along a second portion of the flow passage has substantially a positive exponential distribution.

18. The method of claim 17, wherein the first portion is proximate the inlet and wherein the second portion is proximate the end.

19. A turbocharger comprising:
a turbine wheel configured to rotate about an axis of rotation; and
a turbine housing that houses the turbine wheel, the turbine housing defining a least one scroll with a volute flow passage, the volute flow passage having an inlet and an end that are spaced apart along a flow axis in a circumferential direction about the axis of rotation;
the volute flow passage defining a plurality of cross sections arranged in series along the flow axis from the inlet to the end, the plurality of cross sections taken normal to the flow axis, the plurality of cross sections having an area (A), a centroid spaced at a radial distance (R) from the axis of rotation, and a sidewall angle;
the volute flow passage having a sidewall angle distribution from the inlet to the end that is at least partly nonlinear;
the volute flow passage having an A/R-distribution from the inlet to the end that is substantially linear;
the volute flow passage having a negative exponential A-distribution proximate the inlet; and
the volute flow passage having a R-distribution from the inlet to the end with two inflection points.

20. The turbocharger of claim 19, wherein the at least one scroll is a first scroll with a first volute flow passage;
wherein the turbine housing includes a second scroll with a second volute flow passage;

wherein the second volute flow passage has an A/R-distribution that is substantially linear;
wherein the second volute flow passage has an A-distribution is nonlinear; and
wherein the second volute flow passage has a R-distribution that is nonlinear.

* * * * *